United States Patent [19]

Metcalf et al.

[11] Patent Number: 4,884,401

[45] Date of Patent: Dec. 5, 1989

[54] THREE POSITION DUAL FAILURE SHUT-OFF VALVE SYSTEM

[75] Inventors: Jeffrey D. Metcalf, Albion; Brent A. Klopfenstein, Rockford, both of Ill.

[73] Assignee: Sundstrand Corp., Rockford, Ill.

[21] Appl. No.: 238,097

[22] Filed: Aug. 30, 1988

[51] Int. Cl.[4] .............................................. F16D 31/02

[52] U.S. Cl. ........................................ 60/403; 60/425; 60/484; 91/509; 91/523

[58] Field of Search ................. 91/508, 509, 510, 511, 91/523, 529, 530; 60/403, 425, 484, 494; 74/665 B

[56] References Cited

U.S. PATENT DOCUMENTS

| | | | |
|---|---|---|---|
| 3,295,420 | 1/1967 | Gleason | 91/509 X |
| 3,662,550 | 5/1972 | Lichtfuss | 60/425 X |
| 3,928,968 | 12/1975 | Becker et al. | 91/509 X |
| 4,150,604 | 4/1979 | Fuell | 91/523 X |
| 4,203,712 | 5/1980 | Uehara | 417/218 |
| 4,210,066 | 7/1980 | Aldrich | 91/506 |
| 4,248,573 | 2/1981 | Uehara et al. | 417/216 |
| 4,345,436 | 8/1982 | Johnson | 60/421 |
| 4,384,455 | 5/1983 | Kline | 60/433 |
| 4,395,878 | 8/1983 | Morita et al. | 60/427 |
| 4,498,847 | 2/1985 | Akiyama | 417/216 |
| 4,555,978 | 12/1985 | Burandt et al. | 91/506 |
| 4,561,250 | 12/1985 | Aoyagi et al. | 60/430 |
| 4,600,364 | 7/1986 | Nakatani et al. | 417/216 |
| 4,601,169 | 7/1986 | Hesse et al. | 60/425 X |
| 4,637,781 | 1/1987 | Akiyama et al. | 417/216 |

*Primary Examiner*—Robert E. Garrett
*Assistant Examiner*—Mark A. Williamson
*Attorney, Agent, or Firm*—Antonelli, Terry & Wands

[57] ABSTRACT

A dual hydraulic motor system where motor wobblers are mechanically linked and the motor outputs are torque summed, is controlled by a three position dual valve assembly. Each valve assembly is controlled by pilot pistons that are mechanically linked to provide three functions, one being normal operation, a second where one motor must be shut-off and its load on the system is minimized and the third where both motors are shut-off and significant drag is then provided. These functions are implemented by a separate spool in each valve which has three independent stable positions.

11 Claims, 5 Drawing Sheets

THREE POSITION DUAL FAILURE SHUT-OFF VALVE SYSTEM

TECHNICAL FIELD

This invention relates to a valve system for shutting off hydraulic fluid to a failed hydraulic motor, which may be of a wobble plate type, where two such motors are connected to a single output shaft.

BACKGROUND ART

In the past a power drive unit has used two hydraulic motors with output shafts connected through a gearing arrangement so that a single output shaft can be rotated by either the combined output of both motors or the output of either motor alone. Where a failure of one motor occurs and its output shaft cannot be disengaged from the drive gearing, the failed motor constitutes an additional drag on the system.

Systems of this general type find use in aircraft flight control actuators. Where the controlled element is an airfoil surface, it is desirable in some applications to provide damping of the surface movement when both motors have failed.

DISCLOSURE OF INVENTION

It is an object of the present invention to provide a novel shut-off valve system for use with a pair of hydraulic motors whose outputs are used together or singly to drive an element. In accord with one feature of the present invention, the valving is such as to allow an unpowered motor to be connected so as to avoid excessive drag whereas damping is provided when both motors are unpowered.

A further object is to provide a novel three-position valve having one position for motor operation and two positions where pressurized fluid flow is prevented with one of such positions allowing unrestricted flow between the inlet and outlet ports of a motor and the other of such positions restricts this flow.

A still further object of this invention resides in providing a novel valve assembly including a linkage between pilot pistons in each of the valve housings and spools in the same valve housing that are biased to a valve closed position with spring forces of different magnitudes effective to bias the spools toward a valve closed position at which time the linkage has one position that is different from the position when pressurized hydraulic fluid is applied to either or both of the pilot pistons.

These and other objects of the invention will become more fully apparent from the claims and from the descriptions it proceeds in connection with the drawings.

BEST MODE OF CARRYING OUT THE INVENTION

The illustrated system is adapted for use with a hydraulic motor driven power drive unit for operating a member such as a trimable horizontal stabilizer in a flight control actuation system such as shown for example, in U.S. Pat. No. 4,555,978 granted Dec. 3, 1987 to Burnandt, et al, the disclosure of which is hereby incorporated by reference. In such a power drive unit as diagrammatically illustrated in FIG. 1, two separate hydraulic systems are employed, each having a variable displacement hydraulic motor 2, 4 that is operated alone with the other as a backup or alternatively, the motors may be simultaneously operated with motor wobblers mechanically linked as shown at 5. There is also frequently an emergency mechanical control (not shown). The power drive usually includes gearing arrangements such as friction gears 3, 5, 6 so that both hydraulic motors 2, 4 are physically geared together by being connected to a common output shaft 7. By the valving arrangement of the present invention, the failure of one motor 2, 4 is not permitted to cause excessive drag which would inhibit the efficient operation of the other motor. However, if both hydraulic motors fail simultaneously, damping is provided by introducing a restricted orifice.

Figure 2:
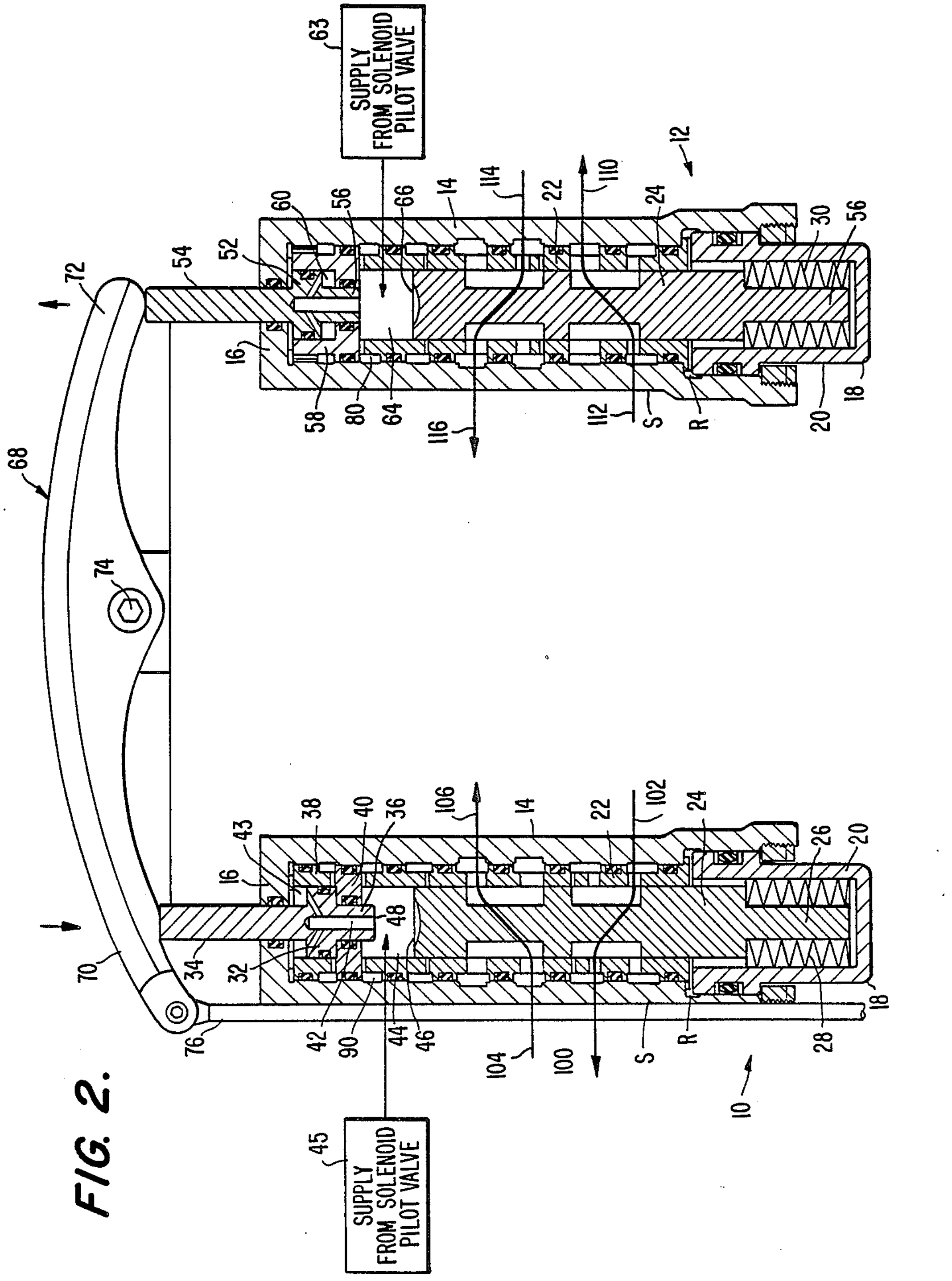
FIG. 2 is diagrammatic view of a valving arrangement for supplying pressurized hydraulic fluid to the motors of FIG. 1 in accordance with the present invention at which time the spools are at their lowermost position to illustrate the system in its normal operating condition.
Figure 3:
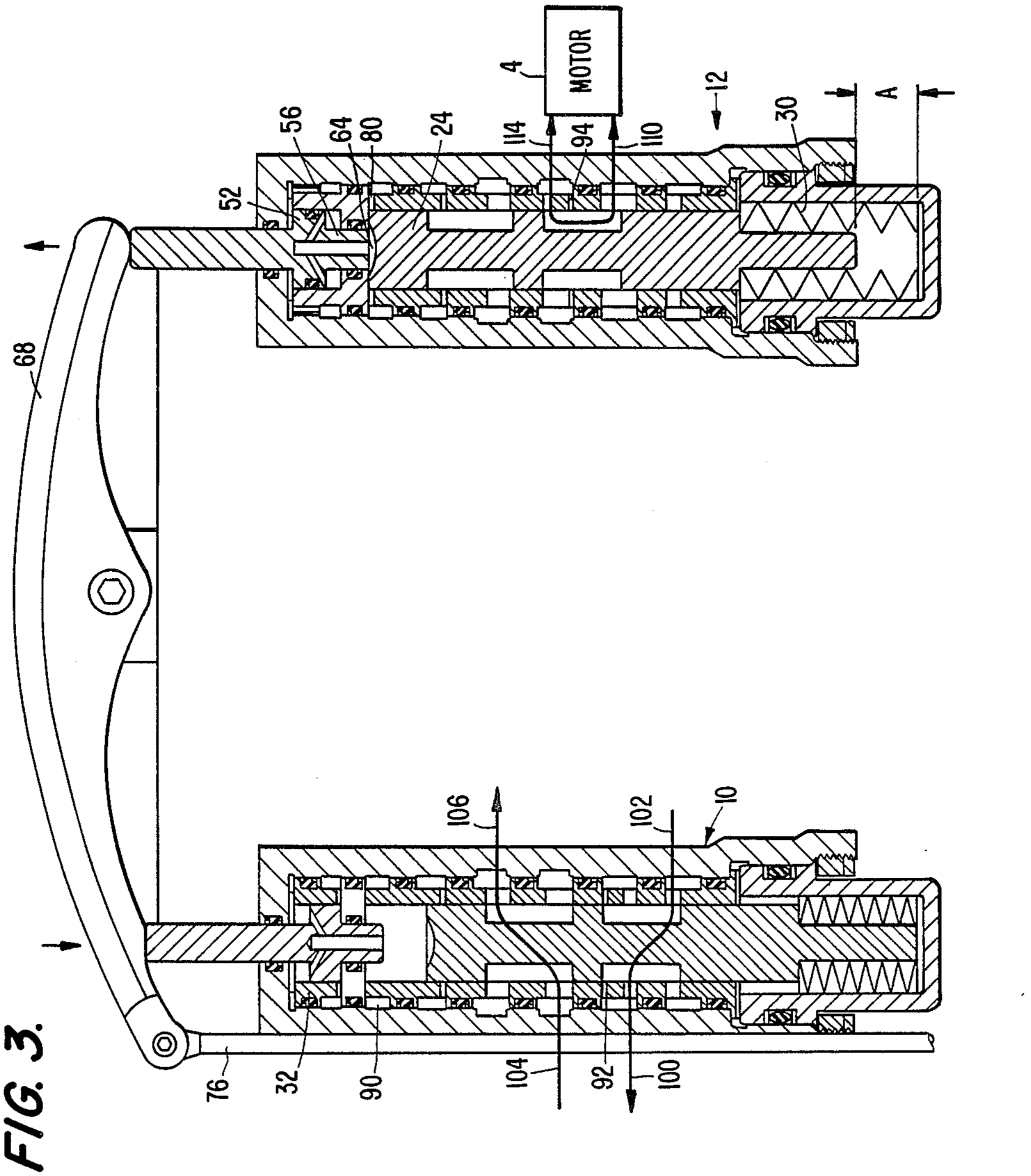
FIG. 3 is a view similar to FIG. 2 when pilot operating pressure to valve 12 has been discontinued as occur when the associated hydraulic motor is in its failure mode which causes the spool in valve 12 to assume an uppermost position.

Referring now to FIGS. 2 and 3, valve 10 is connected to be in the hydraulic circuit including line 100 for supplying hydraulic fluid to and line 104 for returning the fluid from the left hydraulic motor 2. Valve 12 is similarly connected to the right hydraulic motor 4 through hydraulic lines 110 and 114.

Each valve 10 and 12 has an identical outer housing which is generally in the form of a cylindrical housing 14 having an upper end wall 16 and a lower end wall 18 that may be part of a threaded end cap 20. A typical sleeve 22 is positioned along the inside wall of each cylindrical housing 14 and has orifices aligned with the several ports in the walls of housing 14 for conventional connection to the hydraulic lines 100, 102, 104, 106 as shown for valve 10.

Each valve 10 and 12 has an axially slidable spool 24 having a lower stem 26 which extends into a spring member 28, 30, respectively, which preferably is in the form of a stack of Belleville spring members. The force F1 provided by the spring member 28 in valve 10 is greater than the force F2 provided by the spring member 30 in valve 12. Both spring members 28, 30 are shown in FIG. 2 in their compressed state during normal operating conditions with operating pressure supplied to both of the motors 2 and 4.

Figure 5:
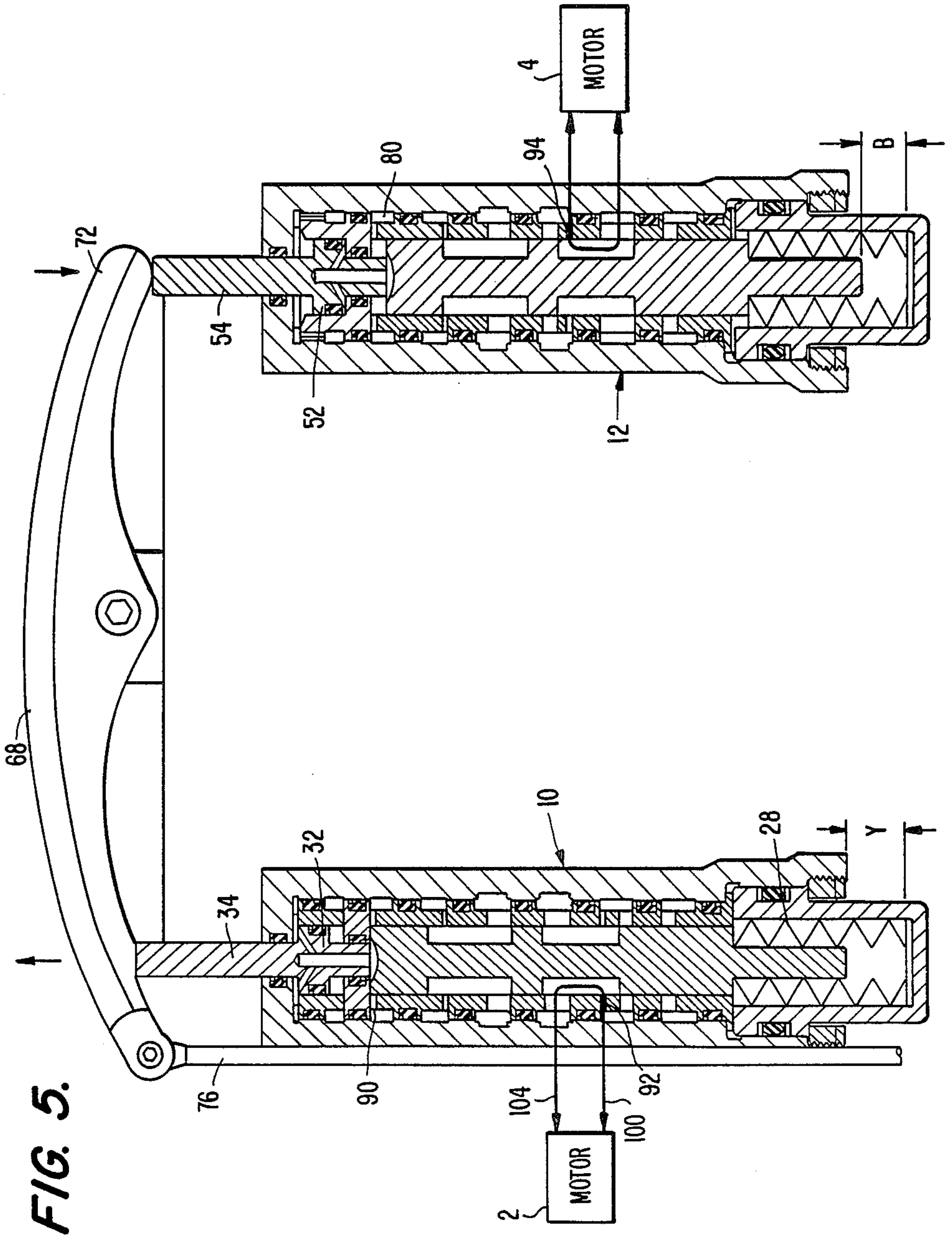
FIG. 5 is a view similar to FIG. 2 when the pilot operating pressure to both of valves 10 and 12 has been discontinued as occurs where there has been a dual failure of both motors which causes the spool in valve 10 to assume its uppermost position, the spool in valve 12 to assume an intermediate position and the rocker 68 to pivot.

At the upper end of valve 10, a pilot piston 32 that is slidable from its lower position shown in FIG. 2 to an upper position as shown in FIG. 5, has an upper stem 34 and a lower stem 36. The central body of pilot piston 32 is mounted for axial sliding movement in a spacer sleeve 38 that is secured in the cylindrical housing 14 at a position adjacent upper end wall 16. Lower stem 36 is similarly mounted in the bushing 40 that is located between the upper end of sleeve 22 and the lower end of spacer sleeve 38.

A central conduit 42 extends through the lower stem 36 and opens at face 43 on the upper side of the central body of pilot piston 32.

Supply fluid pressure from the solenoid operated pilot valve 45 is introduced through port 90 into the chamber 44 between the upper face 46 of spool 24 and the lower end face 48 of the lower stem 36. Pilot valve fluid pressure in chamber 44 passes through central conduit 42 and provides a force which urges pilot piston 32 to its lower position as illustrated in FIGS. 2 and 3.

Turning now to valve 12, a pilot piston 52 that is slidable from its upper position shown in FIG. 2 to a lower position as shown in FIG. 5, has an upper stem 54 and a lower stem 56. The central body of pilot piston 52 and lower stem 56 are mounted for axial sliding movement in a single spacer element 58 that provides a chamber 60 between an upper face on the spacer element 58 and a lower face on the central body of pilot piston 52. A central conduit in the lower stem portion 56 with channels extending into chamber 60 provide supply fluid pressure from supply solenoid pilot valve 63 through port 80 into chamber 64. Chamber 64 is located between the upper face 66 of spool 24 and the end face of the lower stem 56 of pilot piston 52.

A rocker lever 68 has opposite end portions 70 and 72 which engage the upper ends of the upper stems 34, 54 of pilot pistons 32, 52 respectively. Rocker lever 68 is mounted for pivotal movement about the axis of pin 74. Link 76, attached as illustrated in the drawings to one end of rocker lever 68 may be provided for actuating an alarm, a control or other similar device (not shown).

In FIG. 2 where the valves are shown in a position with both motor systems in their operating condition, the end 70 of rocker lever 68 is in its lower position. The end 70 of rocker lever 68 is in its raised position only when both motor systems have failed as illustrated in FIG. 5.

The forces present under the FIG. 5 conditions are solely those provided by the spring member 28 for valve 10 and the spring member 30 for valve 12. Therefore, when no fluid pressure is present for either pilot piston 32 or 52, the end portion 70 of the rocker is raised because the force F1 of spring member 28 is greater than the force F2 of the spring member 30. The displacement of the end portions 70 and 72 of rocker lever about pivot axis 74 is equal to the movement of the pilot pistons 32, 52.

Figure 1:
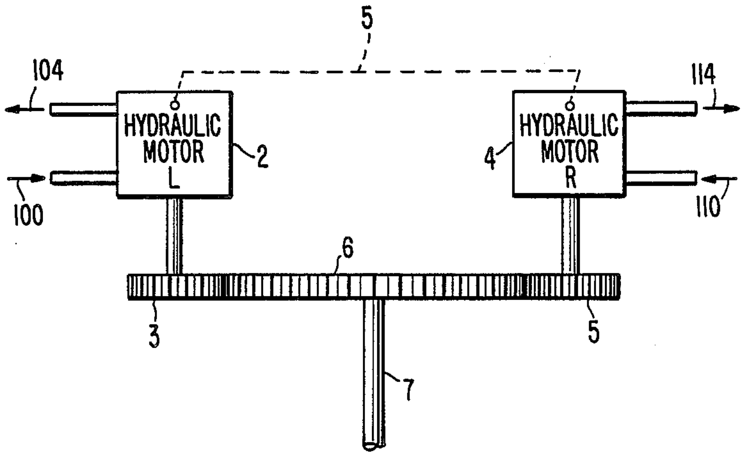
FIG. 1 is a diagram showing two hydraulic motors geared to drive a single output shaft and the hydraulic fluid inlet and outlet lines for each of the motors.

When pilot valve fluid pressure is present in chambers 44 and 64 of valves 10 and 12 respectively, the downward force acting on the upper surfaces 46, 66 of the respective spools must exceed the forces F1 in valve 10 and F2 in valve 12 provided by their respective spring means 28, 30 to force both spools downwardly as illustrated in FIG. 1.

Because of the downwardly acting force on face 43 of pilot piston 32 due to the pilot valve fluid pressure in the chamber at the top of pilot piston 32 bounded by the upper end wall 16 of the body of valve 10 and the relatively small area of the lower stem 36, pilot piston 32 of valve 10 is urged in a downward direction.

Because of the upwardly acting force on all lower surfaces of the pilot piston 52 due to the pilot valve fluid pressure in the chamber 64, pilot piston 52 of valve 12 is urged in an upward direction. Hence, the rocker lever 68 has an end portion 72 in a raised position when pilot valve fluid pressure is applied to both of valves 10 and 12.

Referring now to FIG. 3, the diagram shows the resulting configuration when the pilot valve pressure applied through port 80 of valve 12 has been discontinued, as for example because of a hydraulic motor failure or any other reason which would cause the solenoid operated pilot valve 63 to close. Because the pressure is lost in chamber 64, the spool 24 moves upwardly to its uppermost of three positions against the lower end of the lower stem 56 of pilot piston 52. Pilot piston 52 does not move because, as shown in FIG. 2 it was already at its upper position. The pilot piston 32 in valve 10 however, remains supplied with its pilot valve operating pressure and thus no change occurs in valve 10. The rocker lever 68 does not pivot. The spool valving now provided by valve 12 prevents the supply flow of hydraulic fluid through line 110 and provides recirculation through the ports associated with the lines 110, 114 as discussed below.

Figure 4:
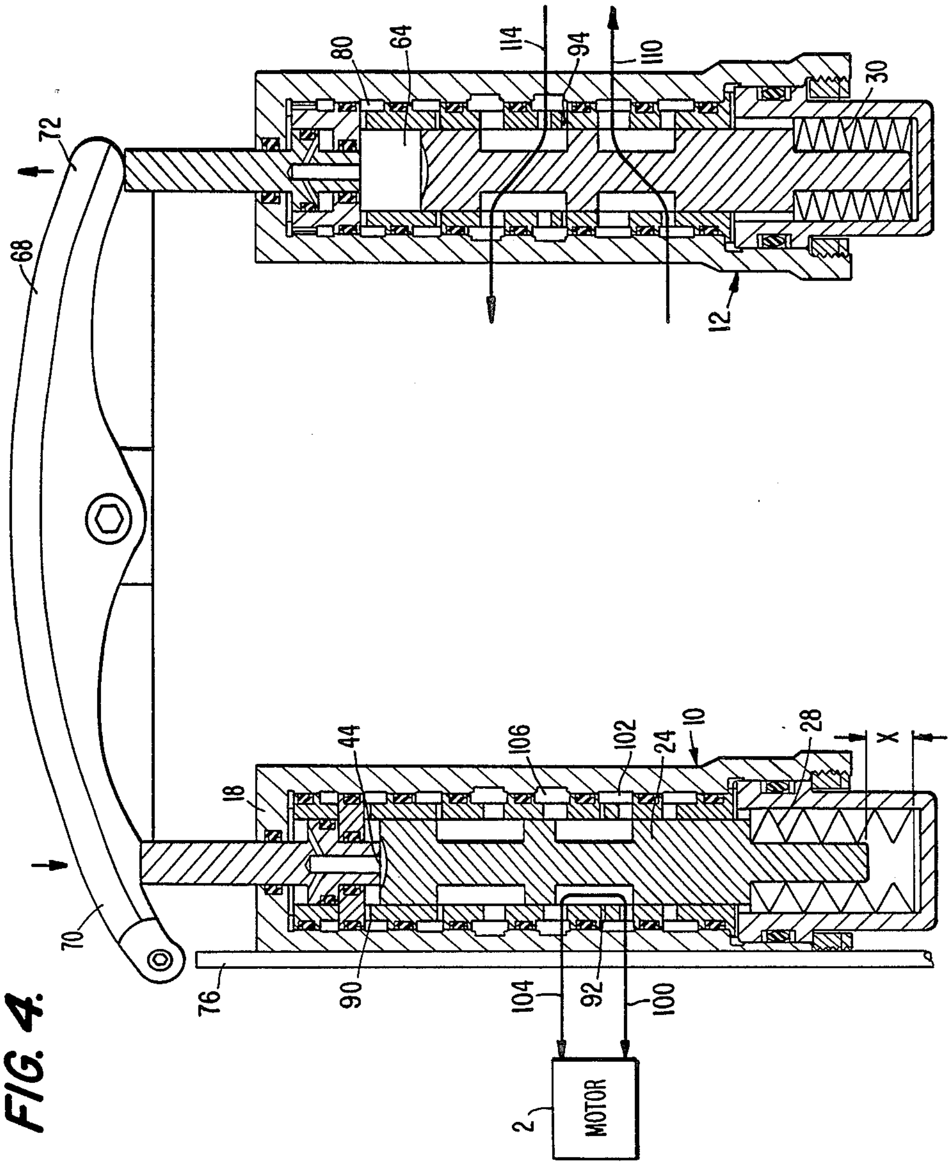
FIG. 4 is a view similar to FIG. 2 when pilot operating pressure to valve 10 has been discontinued as occurs when the associated hydraulic motor is in its failure mode which causes the spool in valve 10 to assume an intermediate position.

Referring now to FIG. 4, this diagram shows the resulting configuration when the solenoid pilot valve 45 closes and pressure applied through port 90 of valve 10 has been discontinued. The rocker lever 68 does not pivot. Because pressure is lost in chamber 44, spool 24 is forced upwardly by spring member 28 to an intermediate of three positions against the lower end of lower stem 36 of pilot piston 32. Pilot piston 32 does not move, even though the pressure in its upper chamber adjacent upper end wall 18 is no longer present, because of the downward force applied by end portion 70 of the rocker lever 68. Thus, the force F1 of spring member 28 of valve 10, while being greater than the corresponding force F2 of the spring member 30 in valve 12, is less than the sum of the force $F_2$ of spring member 30 and the force provided by the pilot valve 52 due to hydraulic pressure from the solenoid operated pilot valve 63.

Referring now to FIG. 5, this diagram shows the resulting configuration when the solenoid operating pilot valves 45 and 63 have both closed and pressure through both of ports 80 and 90 has been discontinued. The rocker lever 68 pivots with end portion 70 being forced upwardly due to the superior spring force F1 provided by spring member 28 as compared to the spring force $F_2$ provided by spring member 30, thereby depressing end portion 72 of rocker lever 68. As a consequence of this action, the spool 24 of valve 10 moves to its uppermost of three positions and the spool 24 of valve 12 moves to its intermediate position.

In normal operation as illustrated in FIG. 2, the spool 24 and valve 10 is in its lowest possible of three positions and the pilot piston 32 is in its lower position. This position of the spool in valve 10 permits supply pressure to be transmitted through ports 102, 100 of valve 10 to the supply portion of the hydraulic motor. Similarly, return oil from the hydraulic motor is permitted to pass through shut-off valve ports 104, 106 and back to the return line. In this position, the valve 10 has essentially no effect on the operation of the hydraulic motor and merely passes the supply oil and its return through the shut-off valve during the operation of the related hydraulic motor.

The spool 24 of valve 12 is also in its lowest possible of three positions and the pilot piston is in a separate upper position. In this position spool 24 of valve 12 permits supply oil and return oil to flow through the shut-off valve with essentially no affect on the operation of the hydraulic motor associated with this valve.

During normal operation, the positions of both spools 24 in valves 10 and 12 are at their maximum downward position and the position of the pilot pistons of the two valves are as illustrated with the pilot piston 32 of valve 10 being in its downward position and the pilot piston 52 of the valve 12 being in its upward position. The difference in positions of the respective pilot pistons 32, 52 is caused by the different configurations of the central conduits 42, 62 formed in these two valves. The internal conduit 42 of pilot piston 32 delivers pressure above the pilot piston into a chamber adjacent end wall 16 and the internal conduit 62 of piston 52 delivers the hydraulic fluid so that it operates in an additive manner on lower surfaces of pilot piston 52 to thereby raise the pilot piston 52 of valve 12 to its upper position.

Referring now to FIG. 4, in this illustration, the left shut-off valve 10 is shown responding to an indication by the solenoid pilot valve 45 that a failure in its hydraulic motor has occurred. The right shut-off valve 12 is unaffected because no failure has occurred in its associated hydraulic motor. Oil pressure from the supply line is no longer provided to the chamber 44 between the spool 24 and pilot piston 32. This results in an upward movement of spool 24 because of the action by spring member 28. Spool 24 moves upward into contact with the lower surface of its associated pilot piston 32. Although no oil pressure is provided to force the pilot piston 32 of valve 10 downward, the combined force provided by the spring member 30 and the oil pressure in chamber 64 of valve 12 is sufficient to exert a force through rocker lever 68 to maintain the pilot piston 32 in valve 10 in its downward or lower position. The upward position of the spool 24 and valve 10 assumes an intermediate position which significantly changes the operation of its related hydraulic motor. For example, the supply pressure on line 102 is blocked by the position of spool 24, and thus no supply pressure is provided to the hydraulic motor associated with the valve 10. Return flow from the motor on line 104 is free to pass through the valve. Significantly, the supply and return lines 100, 104 of the hydraulic motor are connected together with essentially no restriction on this line. Therefore, oil from the return ports of the hydraulic motor passes directly through the shut-off valve 10 to the supply ports of the hydraulic motor. This connection has significantly beneficial results. As both of the hydraulic motors are connected to a common output shaft 7 as shown in FIG. 1, the failed hydraulic motor can be rotated with very little additional drag on the overall system since oil is permitted to be forced from the hydraulic motor through the shut-off valve 10 back to the hydraulic motor with very little resistance. Under these conditions, the hydraulic motor connected to valve 12 can operate normally while experiencing very little drag from the presence of the failed hydraulic motor.

The condition illustrated by FIG. 3 is a single failure mode of the right hydraulic motor oil supply which is connected through valve 12. The left shut-off valve 10 is unaffected because no failure has occurred in its associated hydraulic motor. Solenoid pilot valve 63 no longer provides hydraulic pressure to the chamber 64 of valve 12 between the spool 24 and the pilot piston 52. This results in an upward movement of the spool 24 in valve 12 because of the action by the spring member 30 which moves the spool upward into contact with the lower surface of the pilot piston 52. Since the force $F_2$ of spring member 30, while being less than the force $F_1$ of spring member 28, is nonetheless greater than the net of the upward acting force of $F_1$ from spring member 28 and the downwardly acting force from pilot piston 32 due to the hydraulic pressure in valve 10, there is no change in the position of rocker lever 68. A corresponding operation of the failed hydraulic motor is allowed by reason of essentially unrestricted circulation through lines 110, 114 and the valve 12 when in its extreme upward position as illustrated in FIG. 3.

In FIG. 5, the condition illustrated is that which exists after a dual failure of the two hydraulic motors has occurred and the supply pressure from both solenoid operated pilot valves 45, 63 is discontinued so that no hydraulic fluid pressure is applied to either port 90 of valve 10 or port 80 of valve 12. When the shut-off valves 10, 12 are both in a failure mode, the spool 24 of the valve 10 is in its uppermost position which pushes against the bottom portion of the pilot piston 32 and moves the pilot piston to its upper position. The spool 24 of the valve 12 is likewise urged upwardly by its spring member 30, but only to an intermediate position because the spring force $F_1$ of spring member 28 in valve 10 is intentionally made greater than the spring force $F_2$ of the spring member 30 in valve 12. This force differential causes the valve stem 34 associated with valve 10 and the left end portion 70 of the rocker lever 68 to move to its upward position thereby causing the right end portion 72 of rocker lever 68 to move down and force stem 54 of the pilot piston 52 of valve 12 downward. Spool 24 of valve 12 is then held at a position intermediate its upper and lower extreme positions.

These positions of the spools 24 as illustrated in FIG. 5 in valves 10 and 12 have the following effect. In each shut-off valve 10, 12 the spool 24 is positioned in such a way that oil flowing through the return portion of the hydraulic motor is passed through the shut-off valve and back to the source of the hydraulic motor after passing through a restricted orifice 92, 94 of the valves 10, 12 respectively. These restricted portions 92, 94 may be referred to as blow back orifices. The blow back orifices 92, 94 are designed to restrict the flow of oil from the return portion of the hydraulic motor to the source portion of the hydraulic motor and thereby provide an additional drag on the operation of the hydraulic motor. This additional drag provides a damping effect which is desireable when both hydraulic motors have failed. The damping effect slows down the operation of the entire system because of the fact that both hydraulic motors are provided with additional drag by the shut-off valves 10 and 12 of the present invention.

In summary, it should be noted that the pair of shut-off valves 10, 12 provided by the subject invention perform three important functions. First, during normal operation when neither of the hydraulic motors is experiencing any difficulty, the shut-off valves 10, 12 permit the free flow of hydraulic fluid through the valve bodies and from the hydraulic motors back to the aircraft to permit normal operation. Second, if one of the two hydraulic motors experiences difficulty and must be shut-off, the subject invention provides that the disabled hydraulic motor be, in effect, disconnected from the supply line and provided with a low resistance path for the fluid to flow through the hydraulic motor and through the shut-off valve with very little drag. This is important because the other hydraulic motor which is working properly and connected to the same shaft is not subjected to additional drag provided by the failed motor. Finally, if both hydraulic motors fail, the valves 10, 12 provide passages through them which permit oil to flow through the hydraulic motors and their respective shut-off valves 10, 12, but with the added restriction provided by the blow back orifices 92, 94 to provide significant drag.

While only a single embodiment has been described, it is apparent that other equivalent arrangements may provide comparable results and it is intended that all alternatives which fall within the scope of the appended claims be covered thereby.

We claim:

1. A shut off valve system connected to a pair of hydraulic motors geared together to drive a single output shaft by either or both of said motors comprising;

means for connecting supply hydraulic fluid to and return hydraulic fluid from each motor including first and second valves in first and second cylindrical housings with a spool and a pilot piston in axial alignment and arranged for independent axial movement within each housing;

first means for supplying hydraulic pressure to the pilot piston in said first cylindrical housing;

second means for supplying hydraulic pressure to the pilot piston in said second cylindrical housing;

means for removing hydraulic pressure from the pilot piston in the valve associated with one of said motors for disconnecting the supply hydraulic fluid to said motor while connecting return hydraulic fluid to an inlet of said motor through a path including the spool of said valve to permit recirculation of fluid at a first rate sufficient to avoid excessive drag on the other hydraulic motor; and means for removing hydraulic operating pressure to the pilot pistons in both of said valves for disconnecting the supply hydraulic fluid to each of said motors while connecting return hydraulic fluid from each motor to its inlet through a path including the respective spool for each of said valves to permit recirculation of fluid at a second rate which is lower than said first rate to provide damping of both motors.

2. The valve system as defined in claim 1, wherein said cylindrical housings are located in fixed positions with the axes thereof parallel to each other and the pilot pistons each have stems extending beyond an end wall of their respective cylindrical housing and movable between a first extended position and a second non-extended position, and further including means connecting the pilot piston stems so that one of said stems is in an extended position while the other stem is in a non-extended position.

3. The valve system as defined in claim 2 wherein said pilot piston stem connecting means comprises a rocker arm having a central portion with a pivot axis located between said cylindrical housings and having end portions on opposite sides of said central portion in engagement with the stems of the pilot pistons associated with each of said cylindrical housings.

4. The valve system as defined in claim 3, wherein each of said cylindrical housings contains spring means between one end of its spool and an end wall opposite the end wall through which the pilot valve stem extends, the spring force of said spring means in one of said cylindrical housings being greater than the spring force of the other of said spring means by an amount less than the force due to the pressure of the hydraulic fluid applied to the pilot piston in the valve having the weaker spring.

5. The valve system as defined in claim 4, wherein the spool in each valve has a first longitudinal position providing a free flow of supply hydraulic fluid to and return hydraulic fluid from its respective motor, a second longitudinal position providing only recirculation of hydraulic fluid to its motor at said first rate and a third longitudinal position providing recirculation of hydraulic fluid to its motor at said second rate, the first longitudinal position in each valve being at one extreme position, the second longitudinal position in one valve being at an opposite extreme position and in the other valve being at an intermediate position, and the third longitudinal position in said one valve being at an intermediate position and in the other valve being at an opposite extreme position.

6. The valve system as defined in claim 5, wherein the pilot piston in one cylindrical housing is urged by the supplied hydraulic pressure in a direction away from the spool in its cylindrical housing and the pilot piston in the other cylindrical housing is urged by the supplied hydraulic pressure in a direction toward the spool in its cylindrical housing.

7. The valve system as defined in claim 6, wherein the pilot pistons in both cylindrical housings are displaced to a position opposite their normal operating position only when the supplied hydraulic pressure is removed from both pilot pistons.

8. The valve system as defined in claim 2, wherein each of said cylindrical housings contains spring means between one end of its spool and an end wall opposite the end wall through which the pilot valve stem extends, the spring force of said spring means in one of said cylindrical housing being greater than the spring force of the other of said spring means by an amount less than the force due to the pressure of the hydraulic fluid applied to the pilot piston in the valve having the weaker spring.

9. The valve system as defined in claim 1, wherein the spool in each valve has a first longitudinal position providing free flow of supply hydraulic fluid to and return hydraulic fluid from its respective motor, a second longitudinal position providing only recirculation of hydraulic fluid to its motor at said first rate and a third longitudinal position providing recirculation of hydraulic fluid to its motor at said second rate, the first longitudinal position in each valve being at one extreme position, the second longitudinal position in one valve being at an opposite extreme position and in the other valve being at an intermediate position, and the third longitudinal position in said one valve being at an intermediate position and in the other valve being at an opposite extreme position.

10. The valve system as defined in claim 1, wherein the pilot piston in one cylindrical housing is urged by the supplied hydraulic pressure in a direction away from the spool in its cylindrical housing and the pilot piston in the other cylindrical housing is urged by the supplied hydraulic pressure in a direction toward the spool in its cylindrical housing.

11. The valve system as defined in claim 10, wherein the pilot pistons in both cylindrical housings are displaced to a position opposite their normal operating position only when the supplied hydraulic pressure is removed from both pilot pistons.

* * * * *